(12) United States Patent
Moll

(10) Patent No.: US 9,196,170 B2
(45) Date of Patent: Nov. 24, 2015

(54) MULTI-PURPOSE DIGITAL COLORING TOOLS

(71) Applicant: Crayola LLC, Easton, PA (US)

(72) Inventor: Joseph Thomas Moll, Bethlehem, PA (US)

(73) Assignee: Crayola, LLC, Easton, PA (US)

( * ) Notice: Subject to any disclaimer, the term of this patent is extended or adjusted under 35 U.S.C. 154(b) by 107 days.

(21) Appl. No.: 13/925,351

(22) Filed: Jun. 24, 2013

(65) Prior Publication Data

US 2013/0344771 A1    Dec. 26, 2013

Related U.S. Application Data

(60) Provisional application No. 61/664,416, filed on Jun. 26, 2012.

(51) Int. Cl.
 *G09B 11/10* (2006.01)
 *G06F 3/0354* (2013.01)
 *G06K 9/22* (2006.01)

(52) U.S. Cl.
 CPC ............ *G09B 11/10* (2013.01); *G06F 3/03542* (2013.01); *G06K 9/222* (2013.01)

(58) Field of Classification Search
 CPC ....................................................... G09B 11/10
 See application file for complete search history.

(56) References Cited

U.S. PATENT DOCUMENTS 3,535,791 A * 10/1970 Oppenheim ................. 33/27.11
3,813,787 A *  6/1974 Mercorelli ....................... 33/565
8,187,051 B2 *  5/2012 Miller et al. ................... 446/175

* cited by examiner

*Primary Examiner* — Michael Dennis
(74) *Attorney, Agent, or Firm* — Shook, Hardy & Bacon, L.L.P.

(57) ABSTRACT

Multi-purpose digital coloring tools for interacting with a touch screen are described. A pattern-making device provides for patterned input from a digital marking tool on a touch-screen device. The pattern-making device guides the digital marking tool with a plurality of gear teeth on an internal edge of a template frame secured to a touch-screen device using a base unit. Light images are created by a light stylus that interacts with a touch-screen device or an emulsion-surface device. An easel support structure holds a touch-screen device in an upright position during marking with the digital marking tool. Digitally animated coloring book pages are adapted to interact with a touch-screen device. Digital crayons, digital stamping devices, a digital paintbrush, a dual-tip digital stylus for creating 3-dimensional (3-D) images, and a pair of 3-D glasses are provided for interacting with a touch-screen device.

17 Claims, 15 Drawing Sheets

MULTI-PURPOSE DIGITAL COLORING TOOLS

CROSS-REFERENCE TO RELATED APPLICATIONS

This application claims priority to U.S. Provisional Application No. 61/664,416, entitled "Multi-Purpose Digital Coloring Tools," filed Jun. 26, 2012, the disclosure of which is hereby incorporated by reference in its entirety.

SUMMARY

Embodiments of the invention are defined by the claims below, not this summary. A high-level overview of various aspects of the invention are provided here for that reason, to provide an overview of the disclosure, and to introduce a selection of concepts that are further described in the Detailed-Description section below. This summary is not intended to identify key features or essential features of the claimed subject matter, nor is it intended to be used as an aid in isolation to determine the scope of the claimed subject matter. In brief and at a high level, this disclosure describes, among other things, multi-purpose digital coloring tools for interacting with a touch screen. In one embodiment, a pattern-making device provides for patterned input from a digital marking tool on a touch-screen device. The pattern-making device guides the digital marking tool with a plurality of gear teeth on an internal edge of a template frame secured to a touch-screen device using a base unit. A pattern disc, having gear teeth that engage with the gear teeth on the internal edge of the template frame, guides the digital marking tool on the surface of the touch screen.

In another embodiment, light images are created by a battery-powered light stylus that interacts with a touch-screen device or an emulsion-surface device. Further embodiments of the invention include an easel support structure with a surface for holding a touch-screen device in an upright position during marking with the digital marking tool. In another embodiment, digital animated coloring-book pages are adapted to interact with a touch-screen device. For example, animated images on the touch-screen device are coordinated to be visible in connection with portions of the coloring-book pages. Another embodiment of the invention includes a set of digital crayons and digital stamping devices for interacting with a touch-screen device. The digital stamping devices may include both digital stamping features for interaction with a touch-screen device, as well as traditional self-inking stamp features for use on writing surfaces. In a further embodiment, digital tools for interacting with a touch-screen device may be included in an art case filled with digital and non-digital tools. The digital tools may include a digital crayon, a digital paintbrush, a dual-tip digital stylus for creating 3-dimensional (3-D) images, and a pair of 3-D glasses for use with the dual-tip stylus.

DESCRIPTION OF THE DRAWINGS

Illustrative embodiments of the invention are described in detail below with reference to the attached drawing figures, and wherein.

DETAILED DESCRIPTION

Figure 1:
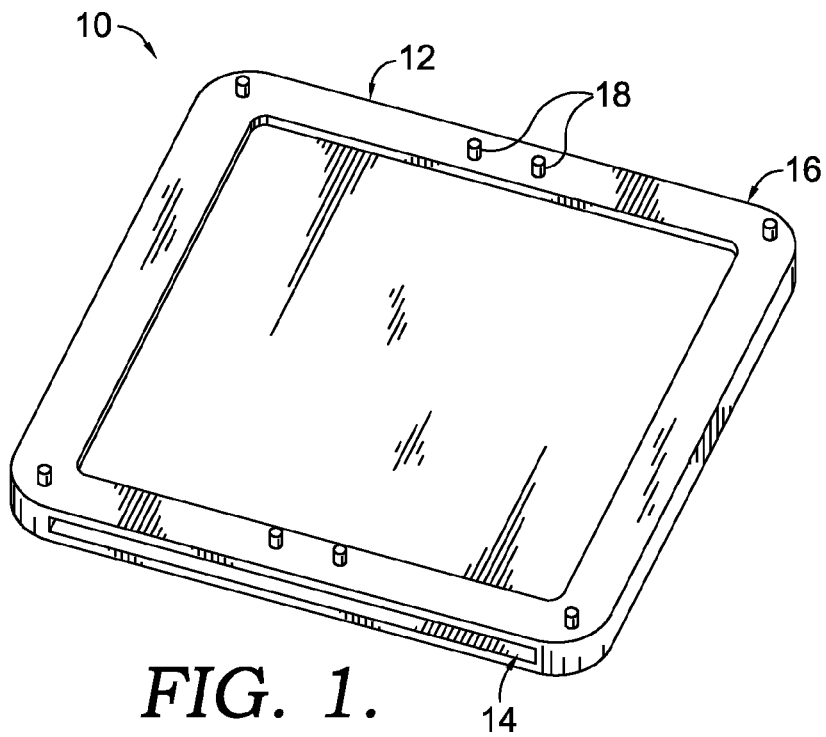
FIG. 1 is a perspective view of the base of a digital pattern-making device, in accordance with an embodiment of the invention.

The subject matter of select embodiments of the invention is described with specificity herein to meet statutory requirements. But the description itself is not intended to necessarily limit the scope of claims. Rather, the claimed subject matter might be embodied in other ways to include different components, steps, or combinations thereof similar to the ones described in this document, in conjunction with other present or future technologies. Terms should not be interpreted as implying any particular order among or between various steps herein disclosed unless and except when the order of individual steps is explicitly described.

Embodiments of the invention provide multi-purpose digital coloring tools for interacting with a touch screen. In one embodiment, a pattern-making device provides for patterned input from a digital marking tool on a touch-screen device. The pattern-making device guides the digital marking tool with a plurality of gear teeth on an internal edge of a template frame secured to a touch-screen device using a base unit. A pattern disc, having gear teeth that engage with the gear teeth on the internal edge of the template frame, guides the digital marking tool on the surface of the touch screen.

In another embodiment, light images are created by a battery-powered light stylus that interacts with a touch-screen device or an emulsion-surface device. Further embodiments of the invention include an easel support structure with a surface for holding a touch-screen device in an upright position during marking with the digital marking tool. In another embodiment, digitally animated coloring-book pages are adapted to interact with a touch-screen device. For example, animated images on the touch-screen device are coordinated to be visible in connection with portions of the coloring-book pages. Another embodiment of the invention includes a set of digital crayons and digital stamping devices for interacting with a touch-screen device. The digital stamping devices may include both digital stamping features for interaction with a touch-screen device, as well as traditional self-inking stamp features for use on writing surfaces. In a further embodiment, digital tools for interacting with a touch-screen device may be included in an art case filled with digital and non-digital tools. The digital tools may include a digital crayon, a digital paintbrush, a dual-tip digital stylus for creating 3-dimensional (3-D) images, and a pair of 3-D glasses for use with the dual-tip stylus.

Embodiments of the invention are described as interacting with a touch-screen device, such as an iPad device from Apple Inc. It should be understood that the various embodiments of multi-purpose digital coloring tools described herein may be adapted to interact with various types of touch-screen devices, and that the embodiments of the coloring tools are not limited to a particular device or application running on a particular device. Further, general references may be made herein to an "application" running on a touch-screen device. As will be understood, embodiments of the multi-purpose digital coloring tools are not limited to a particular type of application and/or set of computer-executable instructions.

With reference now to the figures, apparatus for providing multi-purpose digital coloring tools are described in accordance with embodiments of the invention. Various embodiments are described with respect to the figures, in which like elements are depicted with like numbers.

Pattern-Making Device

Referring initially to FIG. 1, a perspective view of an embodiment of a digital pattern-making device 10 includes a base 12 having first and second openings 14 and 16 on opposite sides of the pattern-making device 10. A plurality of attachment points 18 surround the perimeter of the base 12, for attachment of template frames used in creating patterns with the pattern-making device 10. In embodiments, attachment points 18 may be pegs or any other attachment device extending from or incorporated into the surface of base 12. For example, attachment points 18 may be indentations on the surface of base 12, which engage with protrusions on the surface of a template attached to the base 12. In some embodiments, attachment points 18 may be permanently attached to base 12 at particular locations around the perimeter, while in other embodiments, attachment points 18 may be moveable to a variety of positions.

Figure 2:
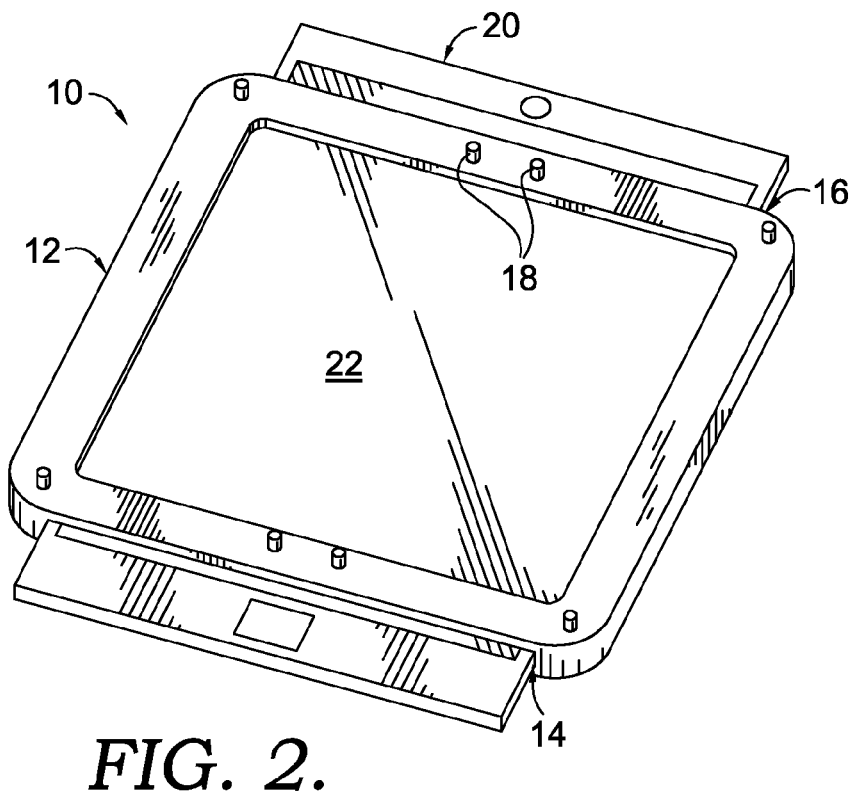
FIG. 2 is a perspective view of the pattern-making device of FIG. 1 coupled to a touch-screen device, in accordance with an embodiment of the invention.
Figure 3:
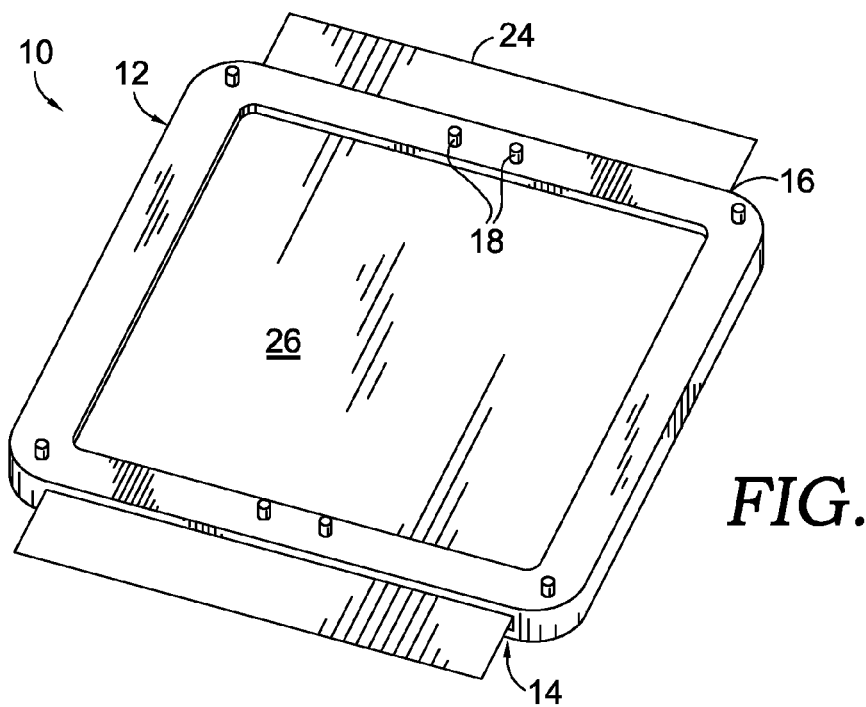
FIG. 3 is a perspective view of the pattern-making device of FIG. 1 coupled to a piece of paper, in accordance with an embodiment of the invention.

As shown in FIG. 2, a touch-screen device 20 is inserted into the base 12 via first and second openings 14 and 16 such that the surface 22 of the touch-screen device 20 is exposed through the top of the base 12. In other words, the top surface of the base 12 acts as a frame around a perimeter of the touch-screen device 20, revealing a framed portion of the center of surface 22. As shown in FIG. 3, in some embodiments, the base 12 may also be adapted to hold a piece of paper 24, thereby exposing a paper writing surface 26 through the top of the base 12.

Figure 4:
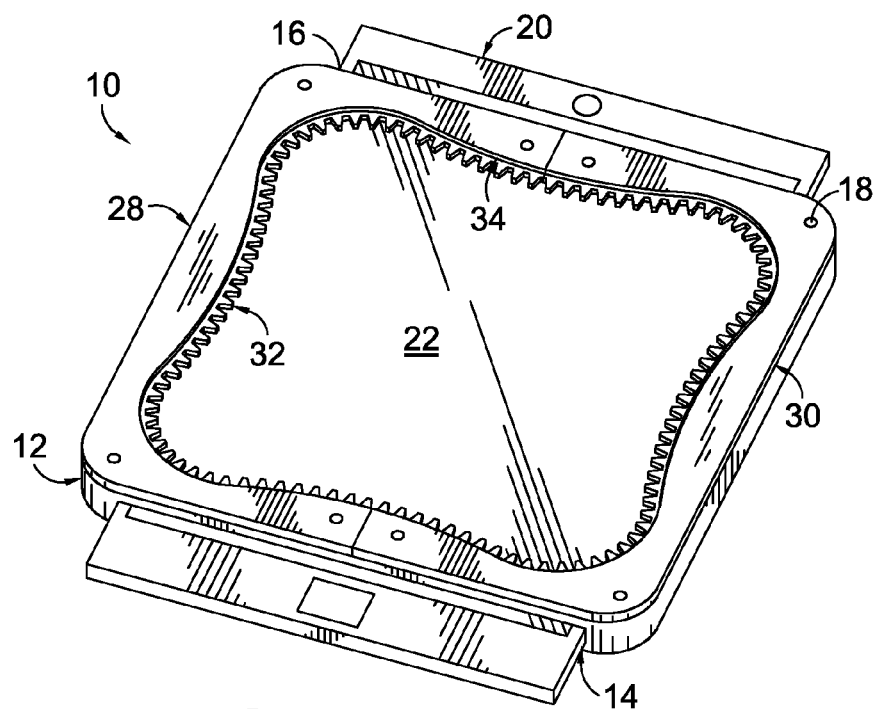
FIG. 4 is a perspective view of the pattern-making device of FIG. 1 coupled to a touch-screen device, with a set of template frames attached to the pattern-making device, in accordance with an embodiment of the invention.

Turning next to FIG. 4, an embodiment of the digital pattern-making device 10 is equipped with two template frames attached to the base 12, for creating a pattern on the surface 22 of the touch-screen device 20. In particular, a first half of a template frame 28 and a second half of a template frame 30 are attached to the base 12 using attachment points 18. In one example, attachment pegs 18 are inserted into indentations and/or holes in template frames 28 and 30. It should be understood that any number and/or arrangement of attachment points 18 may be used to attach the first and second halves of template frames 28 and 30 to the base 12. Accordingly, one or more attachment points 18 may engage with one or more template frames and/or portions of template frames to create a surface against which a user can create a pattern on the touch-screen device 20. Template frames 28 and 30 each have multiple gear teeth 32 on an interior edge 34 of the frames. In embodiments, gear teeth 32 are evenly spaced around the interior edge 34, creating a consistent perimeter of a ridged surface surrounding the visible surface 22 of the touch-screen device 20.

As shown in FIG. 4, the shape of interior edge 34 is unique to the particular configuration of the first and second halves of template frames 28 and 30. Accordingly, various embodiments of the digital pattern-making device 10 may have a variety of different configurations of template frames and corresponding interior edges. For example, in the embodiment depicted in FIG. 4, the curvature of the internal edge 34 on template frame 28 has a convex shape. The same convex shape is repeated on the internal edge 34 of template frame 30, creating a consistent, patterned perimeter around surface 22.

Figure 5:
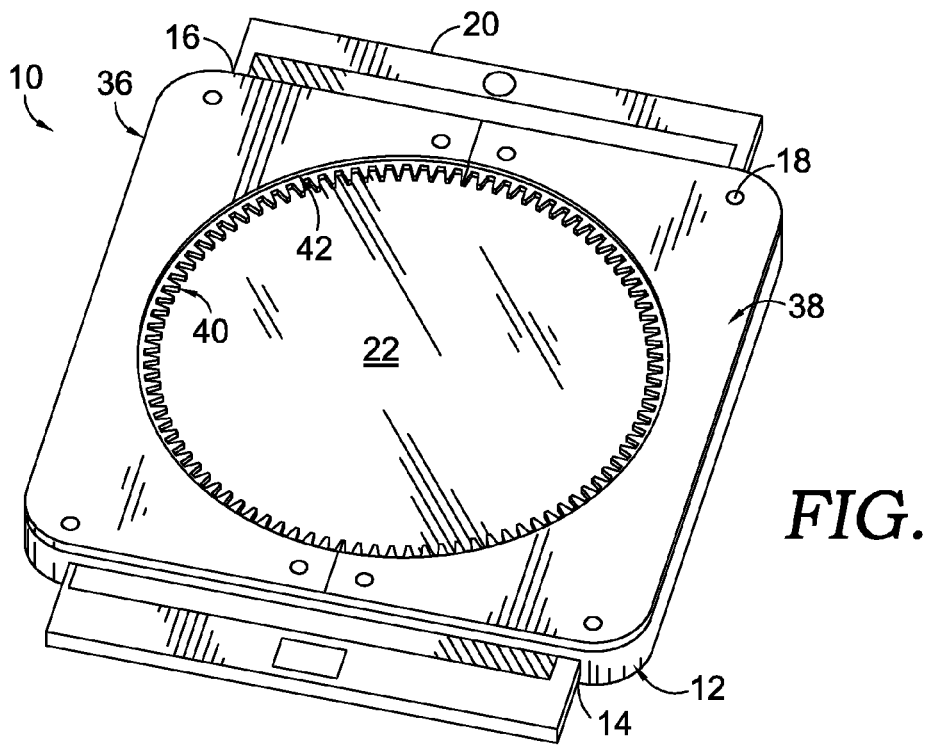
FIG. 5 is a perspective view of the pattern-making device of FIG. 1 coupled to a touch-screen device, with a set of template frames attached to the pattern-making device, in accordance with an embodiment of the invention.

With reference next to FIG. 5, an exemplary digital pattern-making device 10 includes a first half of a template frame 36 and a second half of a template frame 38, coupled to the base 12 using attachment points 18. The gear teeth 40 on internal edge 42 form a consistent perimeter of a ridged surface surrounding the visible surface 22 of the touch-screen device 20. In the embodiment depicted in FIG. 5, the concave internal edge 42 on template frames 36 and 38 creates a consistent, patterned perimeter around surface 22.

Figure 6:
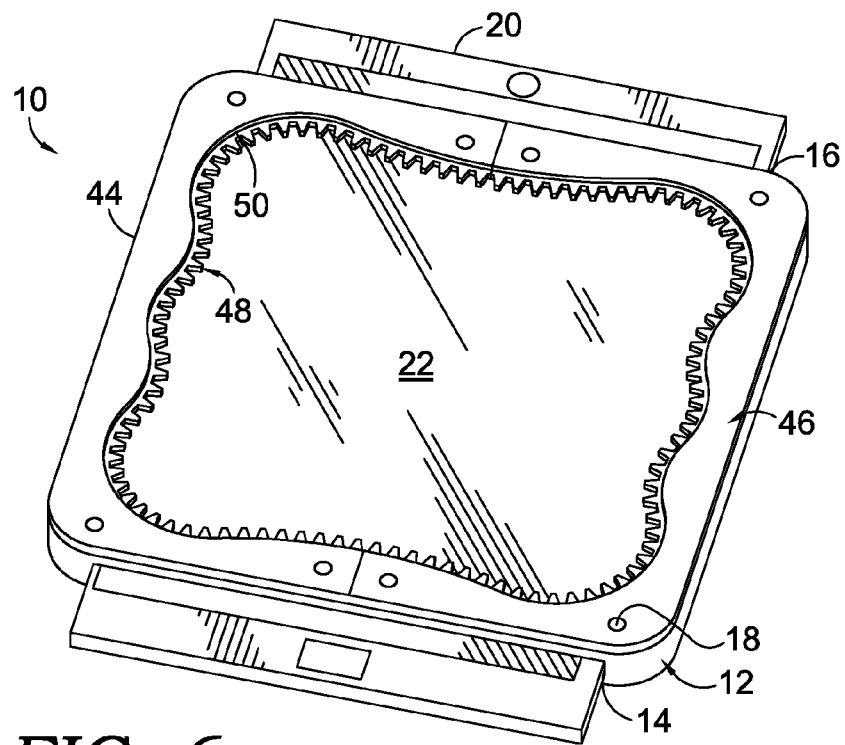
FIG. 6 is a perspective view of the pattern-making device of FIG. 1 coupled to a touch-screen device, with a set of template frames attached to the pattern-making device, in accordance with an embodiment of the invention.

Turning next to FIG. 6, an exemplary digital pattern-making device 10 includes a first half of a template frame 44 and a second half of a template frame 46, coupled to the base 12 using attachment points 18. The gear teeth 48 on internal edge 50 form a consistent perimeter of a ridged surface surrounding the visible surface 22 of the touch-screen device 20. In the embodiment depicted in FIG. 6, the variable concave and convex internal edge 50 on template frames 44 and 46 creates a consistent, patterned perimeter around surface 22.

Figure 7:
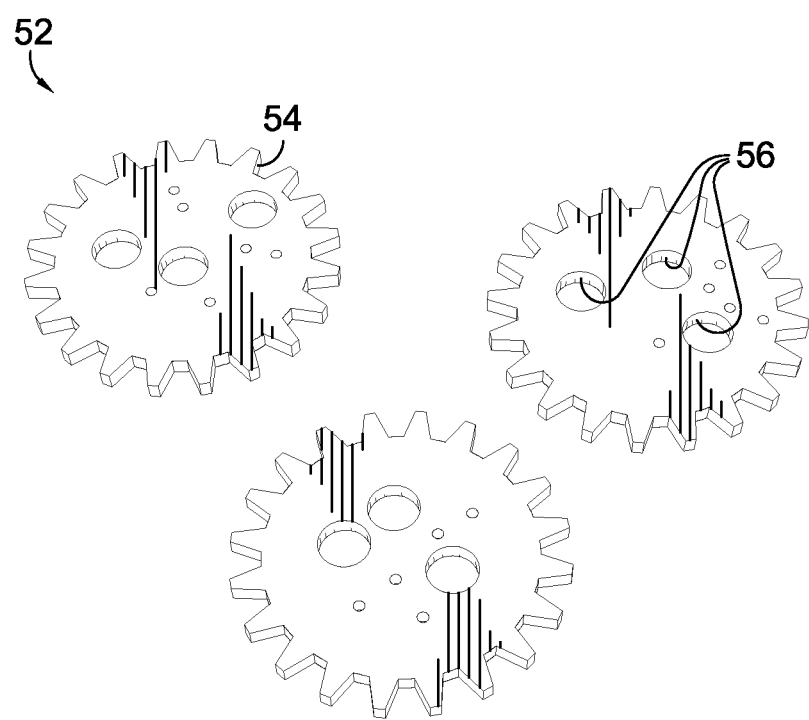
FIG. 7 is a perspective view of a set of pattern discs, in accordance with an embodiment of the invention.

FIG. 7 includes multiple exemplary pattern discs 52, having multiple gear teeth 54 around the outer edge of each disc. In embodiments, gear teeth 54 may be any size or configuration adapted to engage with the gear teeth on an internal edge of a template frame. Additionally, gear teeth 54 are a sufficient height so that the teeth may engage with the internal edge of a template frame when the gear is resting against a marking surface, such as the touch-screen surface 22 or the paper surface 26.

As shown in FIG. 7, pattern discs 52 include multiple openings 56 in each disc. As will be understood, pattern discs 52 may include any number, size, and/or configuration of openings 56 in each of the discs, as the pattern of the openings 56 in FIG. 7 are merely an example of some embodiments. For example, openings 56 may have assorted diameters in random positions on the pattern discs 52 for allowing various tools, such as Crayola® fine-tip markers, Crayola® pencils, a digital stylus, an I-marker, etc.

Figure 8:
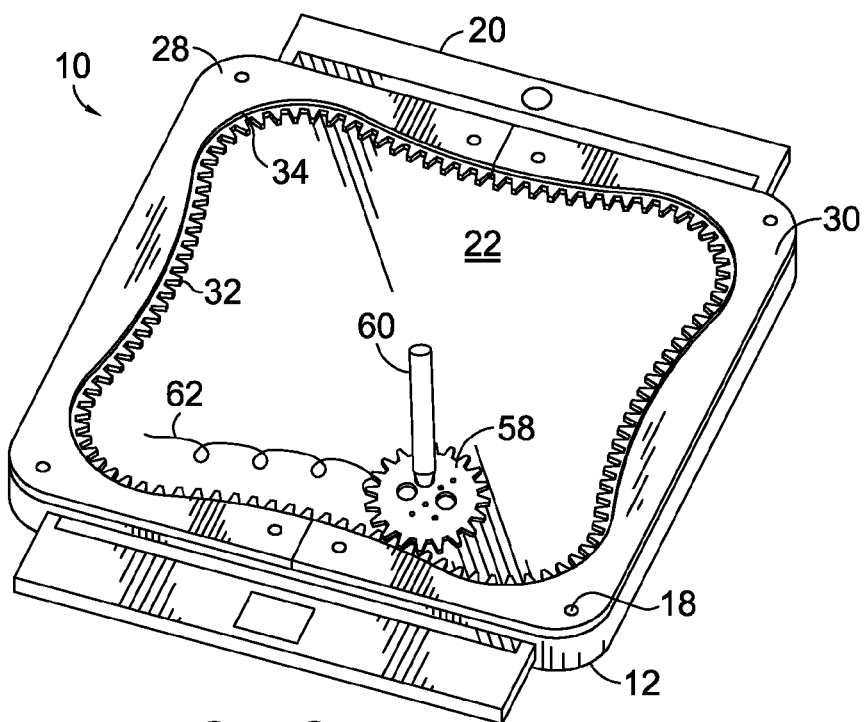
FIG. 8 is a perspective view of the pattern-making device of FIG. 1 coupled to a touch-screen device, with a set of template frames attached to the pattern-making device, a pattern disc on the screen of the touch-screen device, and a digital marking tool contacting the surface of the touch-screen device via the pattern disc, in accordance with an embodiment of the invention.

In embodiments, the multiple openings 56 are used to generate a pattern on a touch-screen device by inserting a stylus or other digital marking tool into one or more openings. For example, in FIG. 8, a marking device 60 is inserted into an opening on a disc 58 that is engaged against the gear teeth 32 on internal edge 34. In the embodiment of FIG. 8, marking device 60 is a digital marking tool, such as a stylus, that is detected by the touch-screen device 20 based on proximity and/or contact with the screen surface 22. In embodiments, rotational movement of the disc 58, as positioned in the same plane as the template frames 28 and 30, engages the gear teeth 54 on disc 58 with the gear teeth 32 on internal edge 34. Accordingly, a corresponding pattern 62 is created by marking device 60 on the surface 22 of touch-screen device 20. In embodiments, corresponding pattern 62 may be changed by 1) the curvature and/or shape of the internal edge 34 of a template frame 28/30, 2) the spacing, size and/or number of openings in the disc 58, and/or 3) the circumference and/or shape of the disc 58. For example, a different pattern 62 would be created on surface 22 using templates 44 and 46, as compared to template frames 28 and 30, due to the curvature of their respective internal edges. Additionally, different patterns of template frames may be interchanged and attached to base 12. For example, template frames 28 and 46 may be attached to base 12 using attachment points 18, thereby creating a unique configuration of the internal edge of the frame, and the surrounding gear teeth, for pattern creation.

Figure 9:
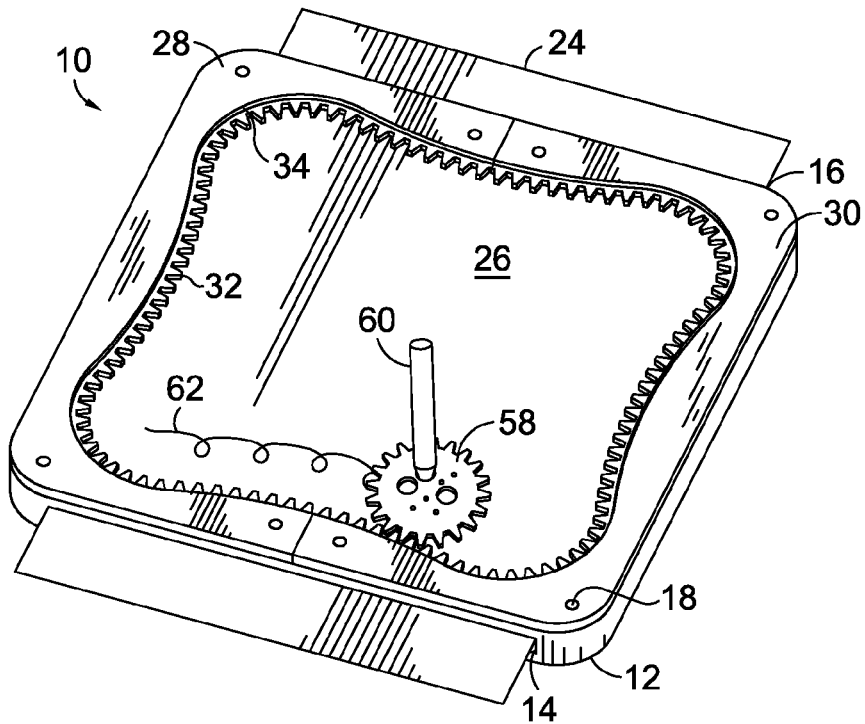
FIG. 9 is a perspective view of the pattern-making device of FIG. 3 coupled to a piece of paper, with a set of template frames attached to the pattern-making device, a pattern disc on the paper, and a non-digital marking tool contacting the surface of the paper via the pattern disc, in accordance with an embodiment of the invention.

In the embodiment depicted in FIG. 9, marking device 60 is a traditional ink marker, used to create a pattern 62 on the surface 26 of paper 24. Accordingly, the openings 56 on gear 58 may be adapted to accommodate multiple different types of marking devices 60.

In further embodiments, additional features associated with the marking device 60 may be used to "enhance" the pattern 62 created on a touch-screen 20 and/or a piece of paper 24. For example, when using a digital stylus, a user can select from an assortment of colors and line widths to create patterns. In further embodiment, special effects may be added to the design/pattern, either during creation or afterward. For example, different media may be applied to the pattern 62, such as chalk, crayon, paintbrush, marker, etc. Three-dimensional images may also be created, and animation of the pattern may be achieved using the application associated with the touch-screen device 20. The scale of a pattern 62 may be adjusted on the screen 22, and the special effect of color may be adjusted. Different levels of the pattern 62 may be adjusted individually, or separated from the pattern 62 and re-ordered by a user. Sound effects may be applied to the pattern, as well as a camera on the touch screen may be used to take pictures used as backgrounds for the digitally-created patterns 62. In further embodiments, the I-marker may be used to create additional enhancements to a pattern 62 drawn using the digital pattern-making device 1 and/or adjust the thickness, size, or style of the markings by the marking device 60.

Digital Light-Painting Device

Figure 10:
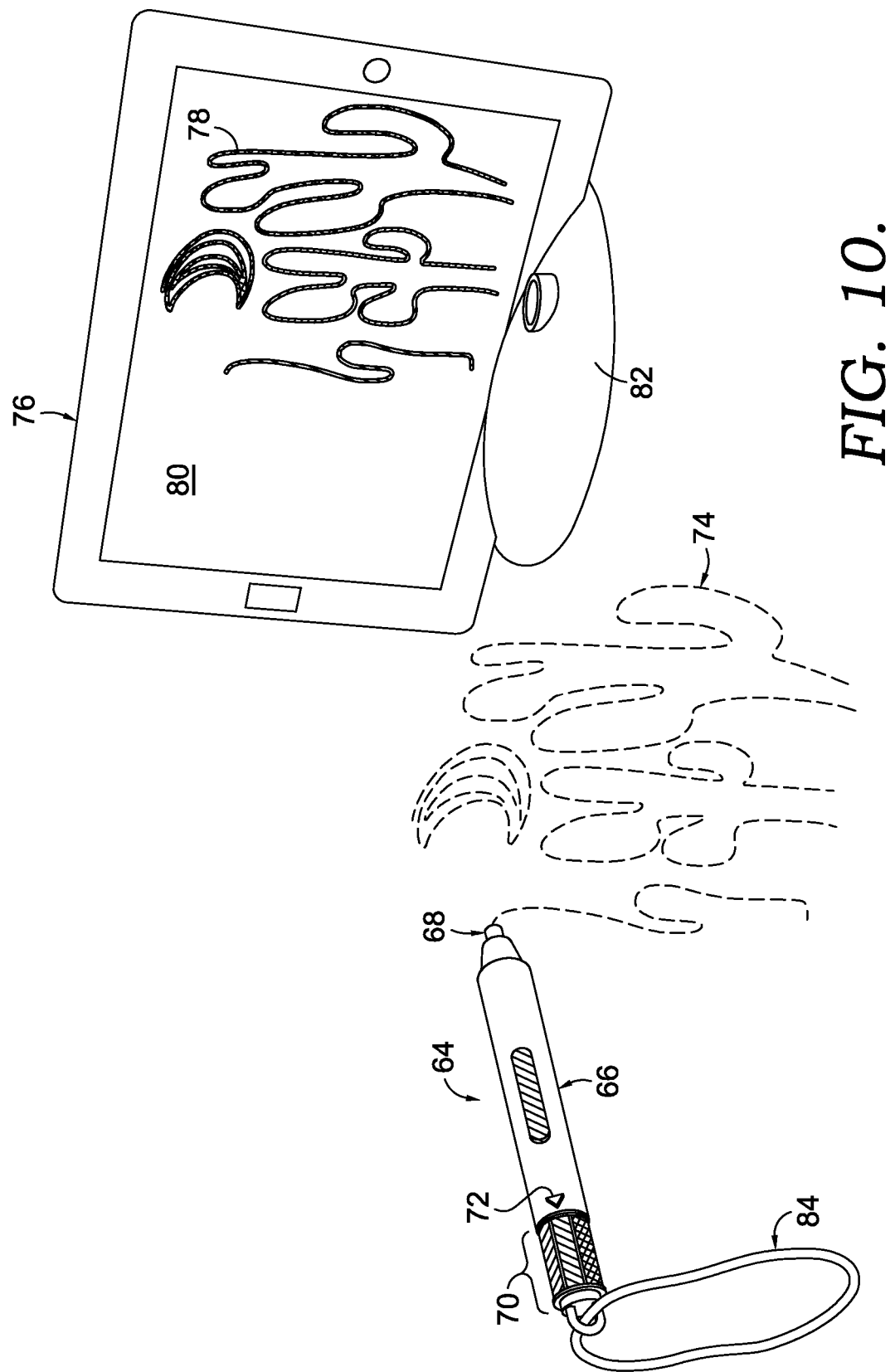
FIG. 10 is a perspective view of a battery-powered stylus generating light images to interact with a touch-screen device, in accordance with an embodiment of the invention.

Turning next to FIG. 10, light images are created by a battery-powered light stylus 64 that interacts with a touch-screen device 76 (or an emulsion-surface device 94 (FIG. 12)). Light stylus 64 may also be referred to as a digital light-painting device. As shown in FIG. 10, embodiments of light stylus 64 include a stylus body 66, a stylus tip 68, a plurality of LED indicators 70, a selector 72, and a strap 84. Any number of LED indicators 70 may be included on the light stylus 64, and LED indicators 70 may be any configuration or combination of colors of lights. Accordingly, selector 72 may be used to select one or more of the LED indicators 70, and a corresponding light color may be emitted by stylus tip 68.

Figure 12:
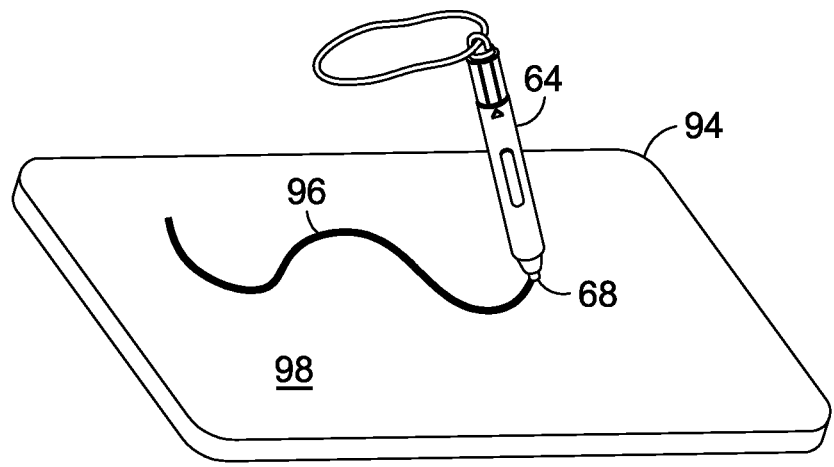
FIG. 12 is a perspective view of the battery-powered stylus of FIG. 10 interacting with an emulsion-surface device, in accordance with an embodiment of the invention.

The light stylus 64 comprises any stylus configuration and technology available in the art that is useable to provide a signal to touch-screen device 76 and/or the emulsion device 94 of FIG. 12. The stylus body 66 is configured similarly to that of a handheld writing device or in another desired configuration. The stylus tip 68 is configured to emit the signal from the light stylus 64. The stylus tip 68 may be configured to focus the signal into a beam or cone transmission or to disperse the transmission. The light stylus 64 might also include one or more control features that are useable to adjust or alter the signal that is transmitted by the light stylus 64.

In an embodiment, the signal is a light transmission in a frequency or frequency band compatible with sensors in a touch-screen device 76. The frequency or frequency band is in any portion of the light spectrum—e.g., infrared, visible, near-visible, ultraviolet, or the like. In an embodiment, the frequency or frequency band of the light transmission is selectable via a control feature on the light stylus 64. In another embodiment, the signal comprises a radio frequency transmission or an ultrasonic transmission. The signal transmission might also be activated by the control features on the light stylus 64. The signal transmission is a continuous transmission or a pulsed transmission and might contain information encoded therein that is receivable by the touch-screen device 76.

In embodiments, a light image 74 may be generated using light stylus 64, and captured by touch-screen device 76. Captured image 78 may be displayed on the surface 80 of touch-screen device 76, with the touch-screen device 76 being held upright in a support stand 82. As will be understood, captured image 78 may be detected using an application running on touch-screen device 76. In one embodiment, a user may select a color of light using LED indicators 70 and selector 72, for creating a light image 74 that is captured by touch-screen device 76. In further embodiments, the light emitted by stylus tip 68 may be selected using an application running on touch-screen device 76, or in further embodiments, using a different combination of LED indicator and selection device and/or a different component coupled to the light stylus 64.

Figure 11:
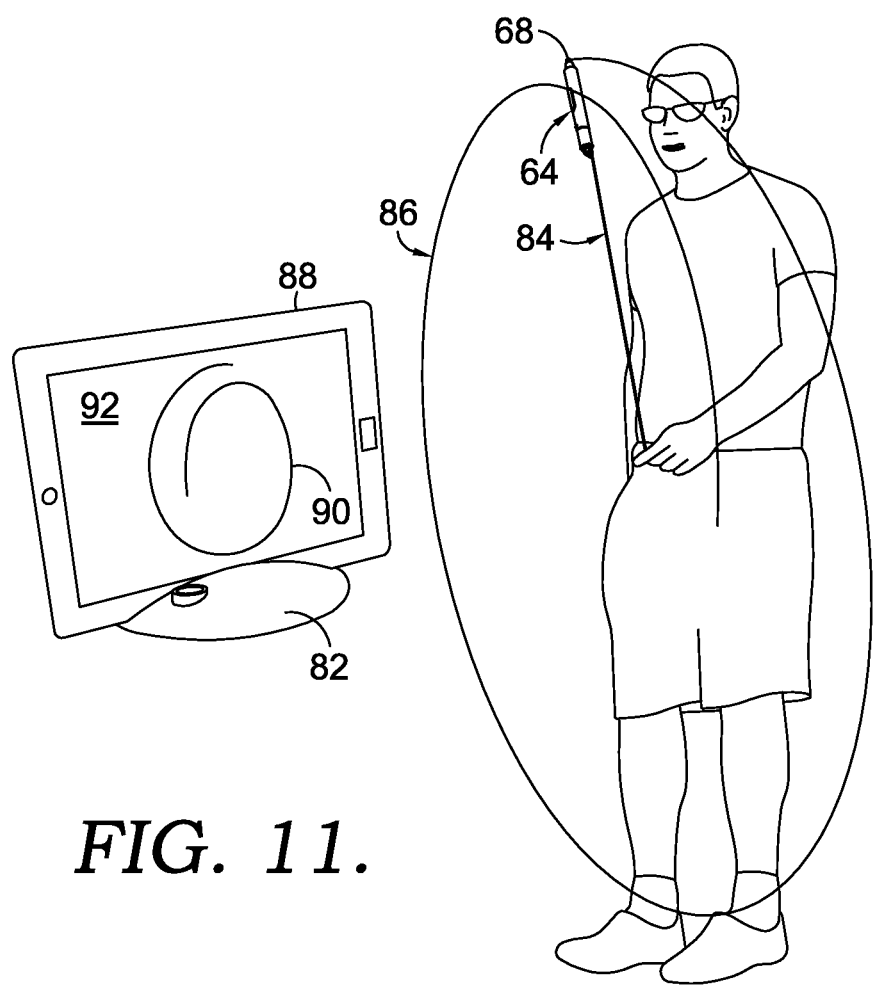
FIG. 11 is a perspective view of the battery-powered stylus of FIG. 10 generating light images to interact with a touch-screen device, in accordance with an embodiment of the invention.

In some embodiments, a particular pattern of light emission, such as a blinking light, a light that is constantly on, or a combination of both may be indicated using selector 72. As shown in FIG. 11, once a light pattern and/or color is selected using selector 72 and LED indicators 70, in some embodiments, a user may swing the light stylus 64 using wrist strap 84. During swinging of the light stylus 64, a persistence of vision light trail 86 is created and captured by touch-screen device 88. Accordingly, captured image 90 may be displayed on touch-screen surface 92 of the touch-screen device 88.

With reference next to FIG. 12, the light stylus 64 may be used to create an image on a light-activated emulsion device 94. The emulsion device 94 has an emulsion surface 98 that glows where it has been contacted by a marking device, such as the contact from stylus tip 68 of the light stylus 64. In embodiments, an image created on the emulsion device 94 may be captured using the camera on a touch-screen device 88.

During and/or after capture and display of a light image 78 and/or a light trail 86 on the screen of a touch-screen device, in embodiments, a number of different manipulation options may be available for treatment of the captured light image. For example, a light image 78 may be superimposed on top of another image displayed on the screen 80. Accordingly, the light image 78 may be "drawn" over the image already displayed on the screen. Additionally, a created light image may be manipulated, such as enlarging or shrinking the image, or animated for further interaction on the touch-screen device. In embodiments, a user may select to change the color of a created light image, either during creation of the light image or after capture and display.

Digital Easel Set

Figure 13:
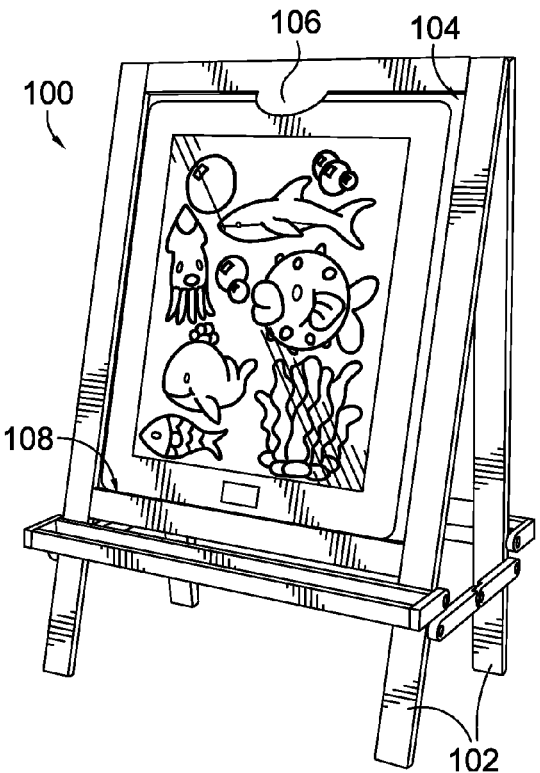
FIG. 13 is a perspective view of an easel support structure with a surface for holding a touch-screen device in an upright position, in accordance with an embodiment of the invention.

Turning next to FIG. 13, a digital easel set 100 includes an easel support structure 102 having a support surface 104, a clip 106, and a ledge 108 for displaying a touch-screen device in an upright position. Digital easel set 100 may also include one or more digital marking tools for marking on the surface of a touch-screen device. As shown in FIG. 13, a touch-screen device is clipped into the easel support structure 102 using clip 106, and supported against ledge 108. As will be understood, any number or configuration of clips 106 may be used to secure a touch-screen device into the easel support structure 102.

Figure 14:
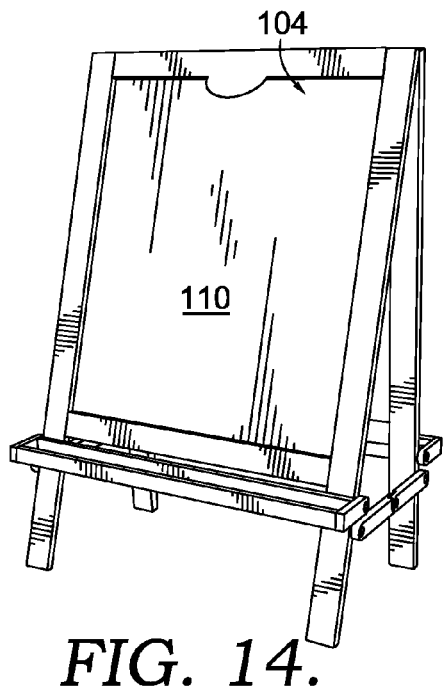
FIG. 14. is a perspective view of the easel support structure of FIG. 13, with the touch-screen device removed to reveal a white, dry-erase surface on the easel support structure, in accordance with an embodiment of the invention.
Figure 15:
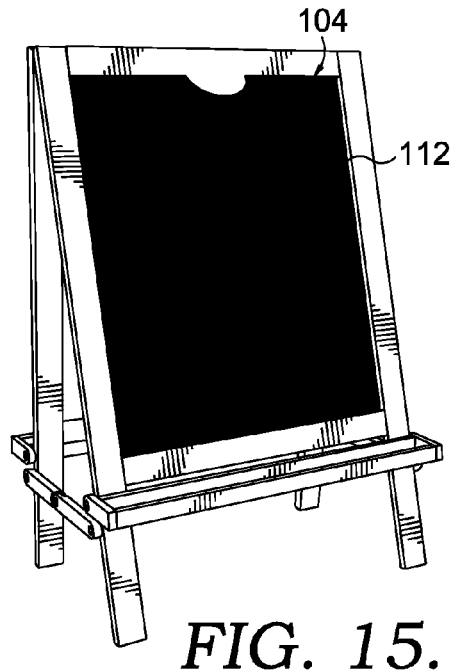
FIG. 15 is a perspective view of the easel support structure of FIG. 13, with the touch-screen device removed to reveal a black, dry-erase surface on the easel support structure, in accordance with an embodiment of the invention.

In embodiments, when a touch-screen device is not being secured by the easel support structure 102, a piece of paper may be clipped to support surface 104, such as attaching a piece of paper using clip 106. In embodiments, additional clips may be incorporated into easel support structure 102 for holding paper in place on support surface 104. With reference to FIGS. 14 and 15, embodiments of easel support structure 102 have two sides with support surfaces 104. In FIG. 14, a first side of easel support structure 102 is a white, dry-erase surface on the easel support surface 104. Further, FIG. 15 depicts an easel support structure 102 with a black, dry-erase surface on the easel support surface 104. Accordingly, a dry-erase marker may be used to write on the easel support surface 104, while a digital marking tool may be used to write on a touch-screen device coupled to the easel support structure 102.

Animated Coloring Books

Figure 16:
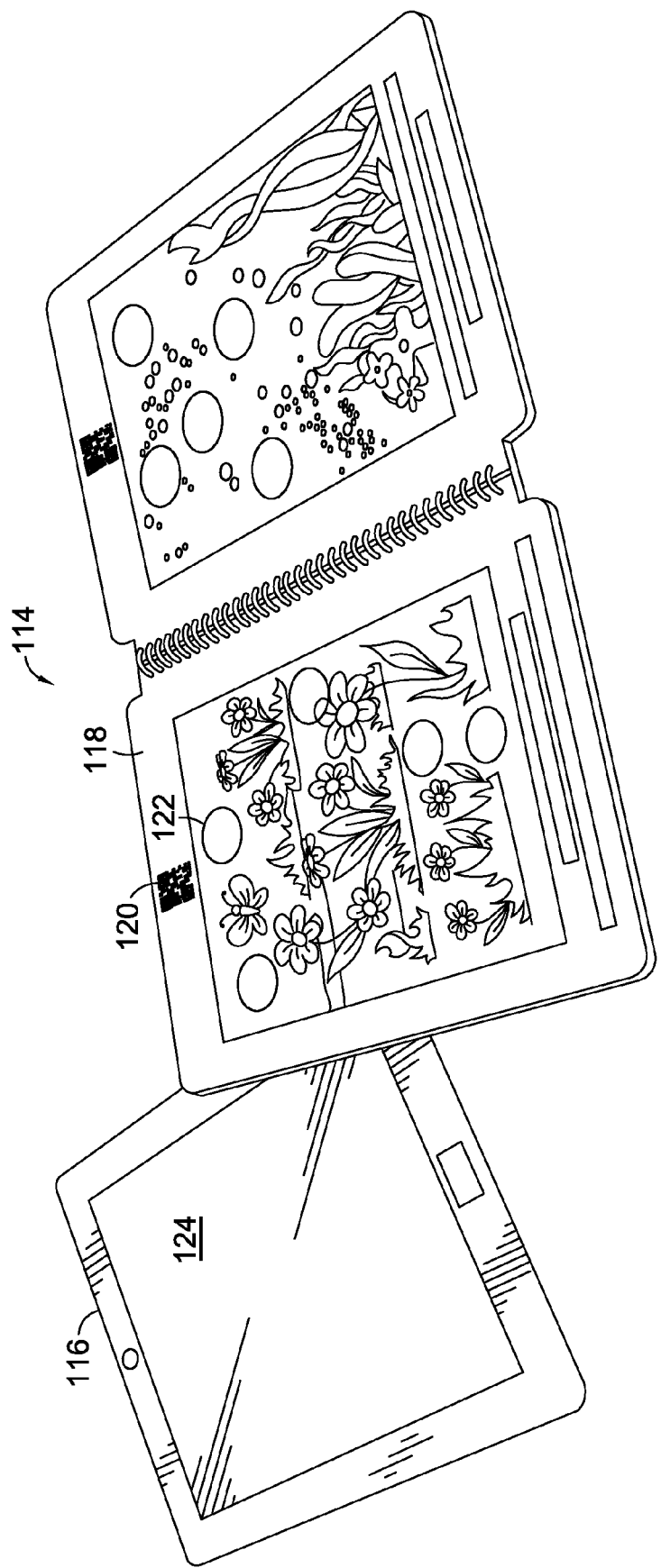
FIG. 16 is a perspective view of a digitally animated coloring book adapted to interact with a touch-screen device, in accordance with an embodiment of the invention.

With reference now to FIG. 16, a digitally animated coloring book 114 is provided for use in association with a touch-screen device 116. The coloring book 114 includes pages 118 that, in some embodiments, are made from heavier paper and/or cardstock material with perforated openings 122 that can be punched out by a user. Pages 118 include identification codes 120, such as a QR code, that can be used by the touch-screen device 116 to identify a particular page inside the coloring book 114. In another embodiment, the identification code 120 may be a digital watermark that is identifiable by the touch-screen device 116. Accordingly, in some embodiments, the identification code 120 may not be visible to a user, but may be recognizable by the touch-screen device 116.

Figure 17:
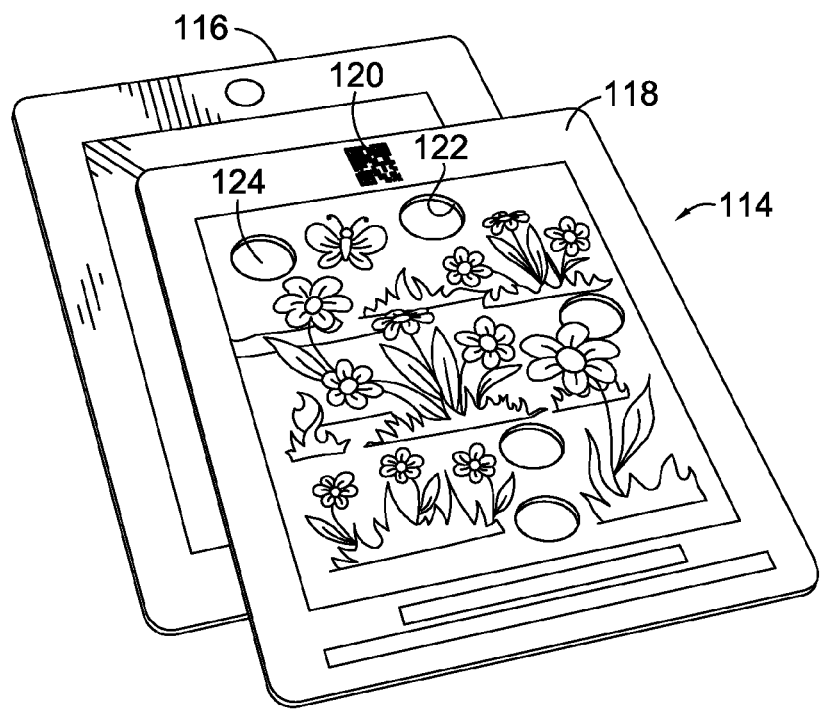
FIG. 17 is a perspective view of a digitally animated coloring-book page adapted to interact with a touch-screen device, in accordance with an embodiment of the invention.
Figure 18:
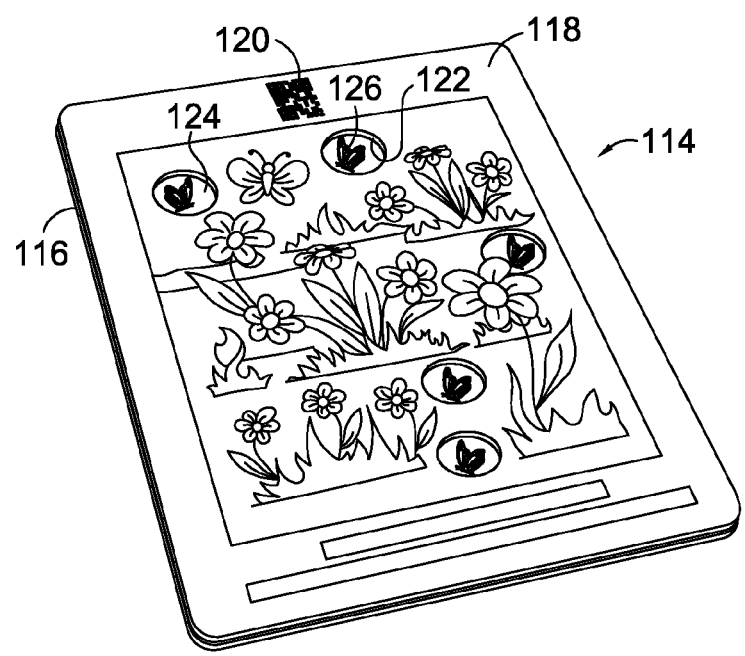
FIG. 18 is a perspective view of a digitally animated coloring-book page overlaid on a touch-screen device, with animated images on the touch-screen device visible in connection with portions of the coloring-book page, in accordance with an embodiment of the invention.

In embodiments, as shown in FIG. 17, a user may color a coloring page 118, punch out the perforated openings 122 on the page 118, identify the page 118 using the camera of the touch-screen device and the identification code 120, and overlay the page 118 on the surface 124 of the touch-screen device. The surface 124 of the touch-screen device 116 may therefore be visible through the openings 122 on the page 118. Based on the touch-screen device's identification of the particular page using the identification code 120, a particular digital element 126 may then be displayed on the touch-screen device 116 for viewing through the openings 122. As shown in FIG. 18, a number of animated digital elements 126 are visible inside multiple openings on the page 118.

In embodiments, page 118 may be designed to be the same size as a touch-screen device, such as an iPad device, such that a user can hold a page 118 over the entire surface 124. Accordingly, the images 126 may be accurately aligned with each of the corresponding openings 122. In some embodiments, multiple, different digital elements 126 may be coordinated for appearance with a particular page 118 and/or opening 122, such that a user may experience a different interactive experience with different instances of pairings of the page 118 and the touch-screen device 116.

Digital Crayons and Digital Stampers Coloring Set

Figure 19:
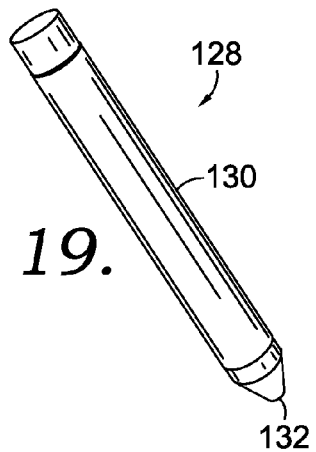
FIG. 19 is a perspective view of a digital crayon for interacting with a touch-screen device, in accordance with an embodiment of the invention.

Turning next to FIG. 19, digital crayon 128 having a generally cylindrical body 130 includes a crayon tip 132 for interacting with a digital touch-screen device. In embodiments, the core of the digital crayon 128 is made of a conductive material that is adapted to activate features associated with an application running on a digital touch-screen device. For example, the digital crayon 128 may be used to color pages displayed on the touch-screen. In embodiments, a touch-screen device is adapted to detect a digital crayon 128 based on sensing the particular dimensions of the crayon tip 132, in addition to the emissions from the conductive material inside the body 130. Accordingly, an application running on the touch-screen device may be configured to detect and/or respond to only those conductive touches from the crayon tip 132, rather than conductive touches by a user's wrist or palm as it contacts the touch screen during coloring.

Figure 20:
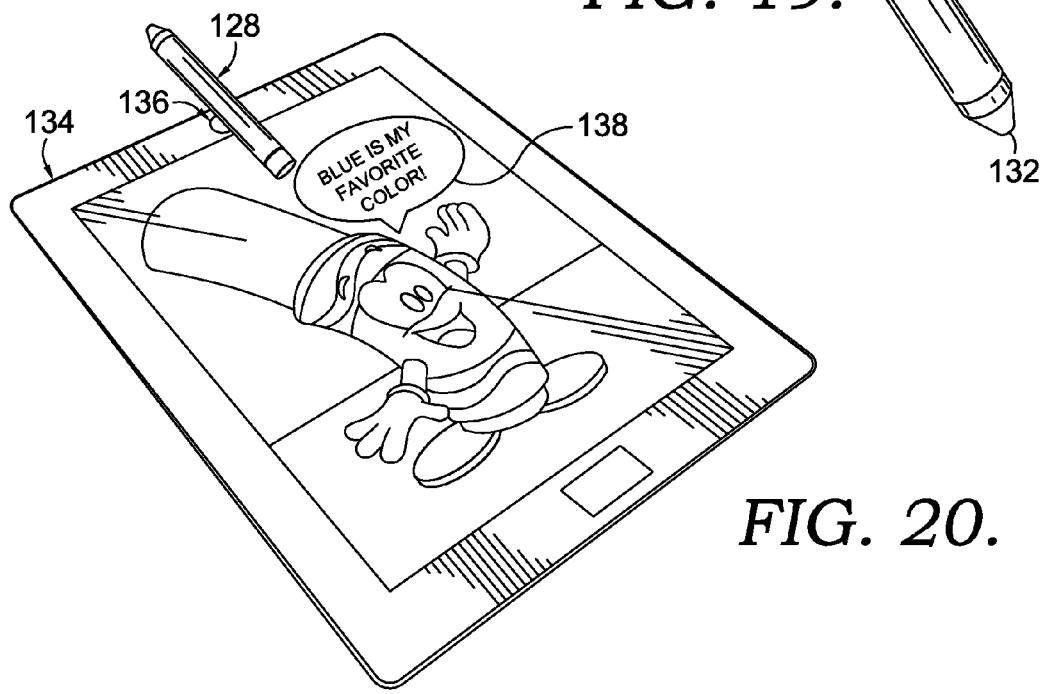
FIG. 20 is a perspective view of the digital crayon of FIG. 19 interacting with a coloring page displayed on a touch-screen device, with the camera of the touch-screen device recognizing the digital crayon, in accordance with an embodiment of the invention.

For use during coloring, and for changing between colors of crayons, the digital crayon 128 may identifiable by a touch-screen device. For example, as shown in FIG. 20, the digital crayon 128 is detected by the touch-screen device 134 using the touch-screen device's camera 136. In embodiments, camera 136 may be used to detect a particular identification marking on digital crayon 128. In other embodiments, camera 136 may identify the color of digital crayon 128 by recognizing the color of the crayon body 130 positioned over camera 136. In FIG. 20, the touch-screen device 134 has recognized the color of exemplary digital crayon 128 as being blue, and has provided an indicator of color identification 138 (e.g., the animation announcing "Blue is my favorite color!"). Various different indicators of color identification 138 may be generated in response to detection by the camera 136. For example, an animation or image may be displayed on the screen of the touch-screen device 134, an identifiable song or tone may be played, or a combination of both a visual and audio indicators may be activated based on recognition of a particular color of digital crayon 128. In embodiments, touch-screen device 134 may identify a number of different colors of digital crayons 128, thereby allowing a user to change crayons during coloring of a page displayed on the touch-screen device.

Figure 21:
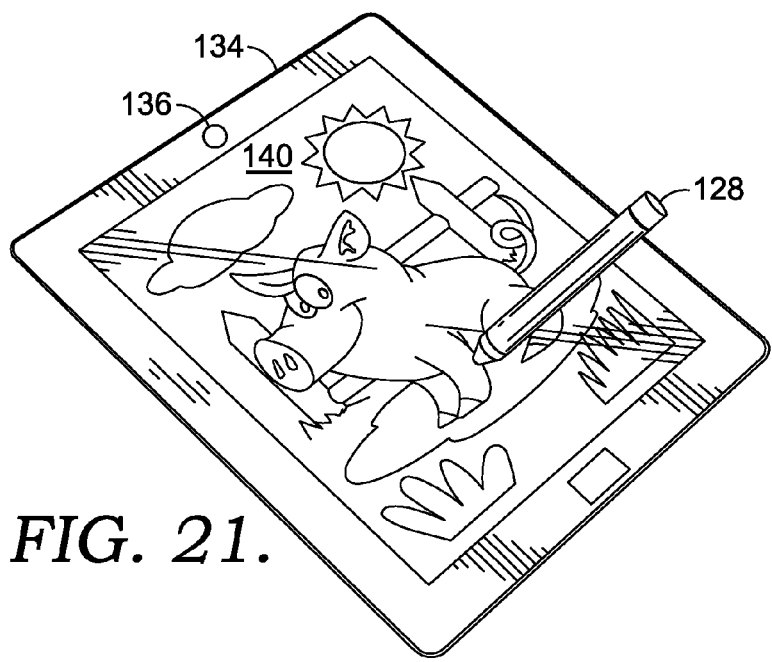
FIG. 21 is a perspective view of the digital crayon of FIG. 19 interacting with a coloring page displayed on a touch-screen device, in accordance with an embodiment of the invention.

In FIG. 21, a digital coloring page is displayed on the screen 140 of touch-screen device 134. Having identified the color of digital crayon 128 (in FIG. 20), the user can "draw" on the screen 140 with the digital crayon 128 and have the application color in the corresponding parts of the image on the digital coloring page. In embodiments, a digital coloring page may be displayed on screen 140 based on recognizing a paper coloring page placed over the camera 136, such as the page recognition described with respect to FIGS. 16-18. After drawing on the image in FIG. 21 with the digital crayon 128 (i.e., the blue crayon), a user may change to a new digital crayon (a different color) for coloring the same or a different image.

Figure 22A:
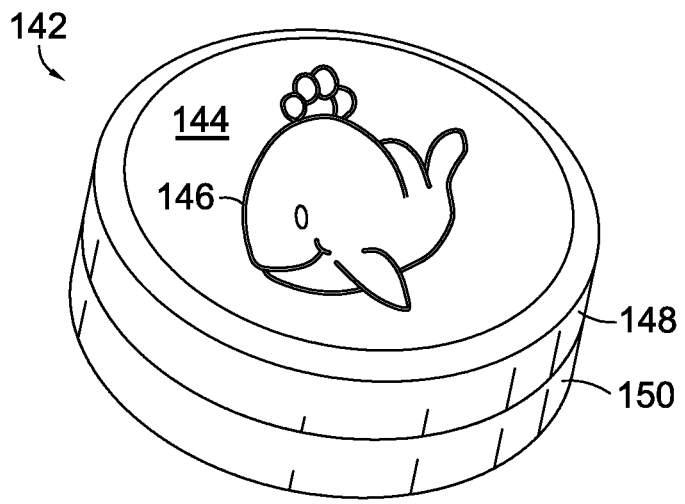
FIG. 22A is a perspective view of a digital stamping device for interacting with a touch-screen device, in accordance with an embodiment of the invention.
Figure 22B:
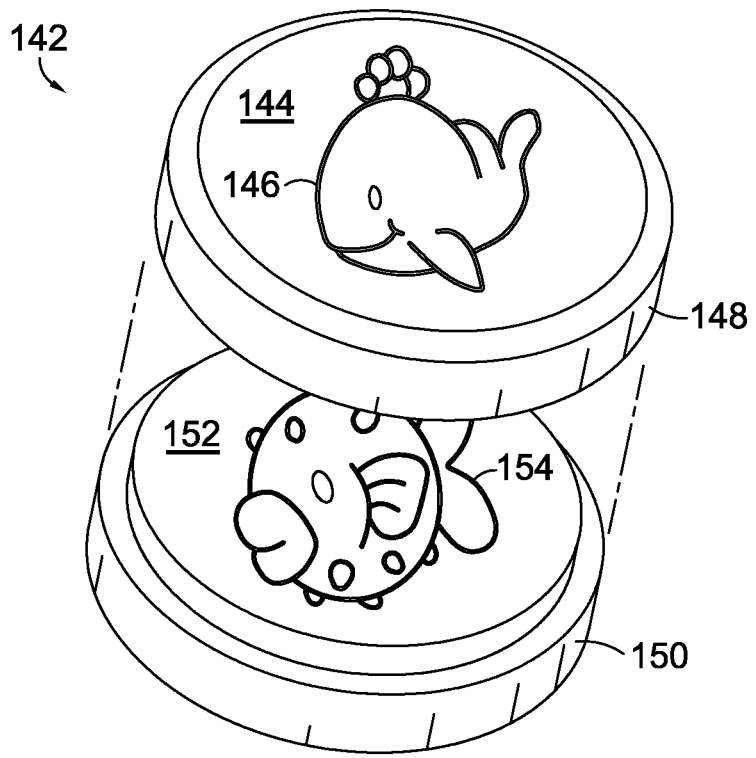
FIG. 22B is a perspective view of the digital stamping device of FIG. 22A with the cap of the digital stamping device raised to reveal traditional self-inking stamp features inside the digital stamping device, in accordance with an embodiment of the invention.
Figure 23:
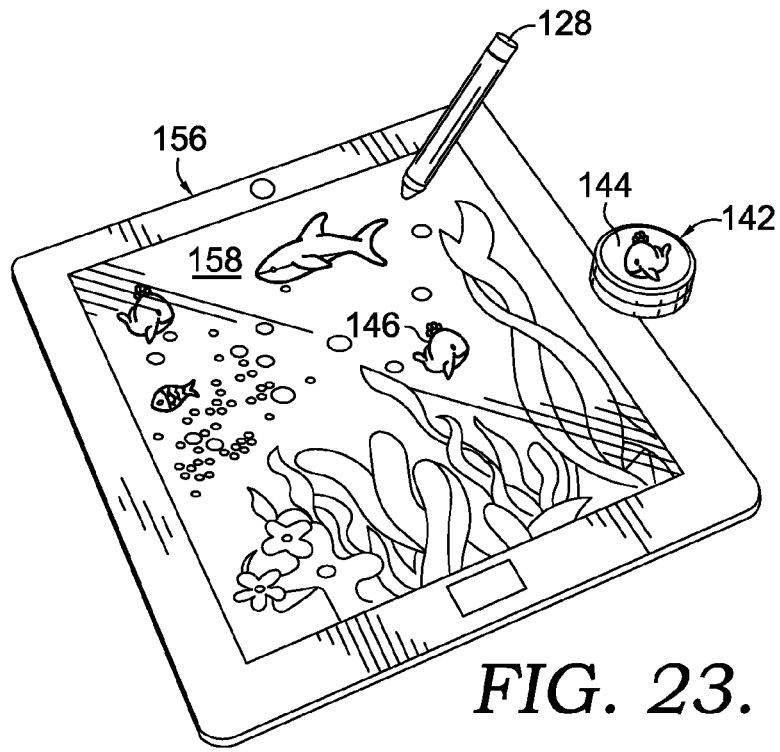
FIG. 23 is a perspective view of the digital stamping device of FIG. 22A interacting with a touch-screen device, in accordance with an embodiment of the invention.
Figure 24:
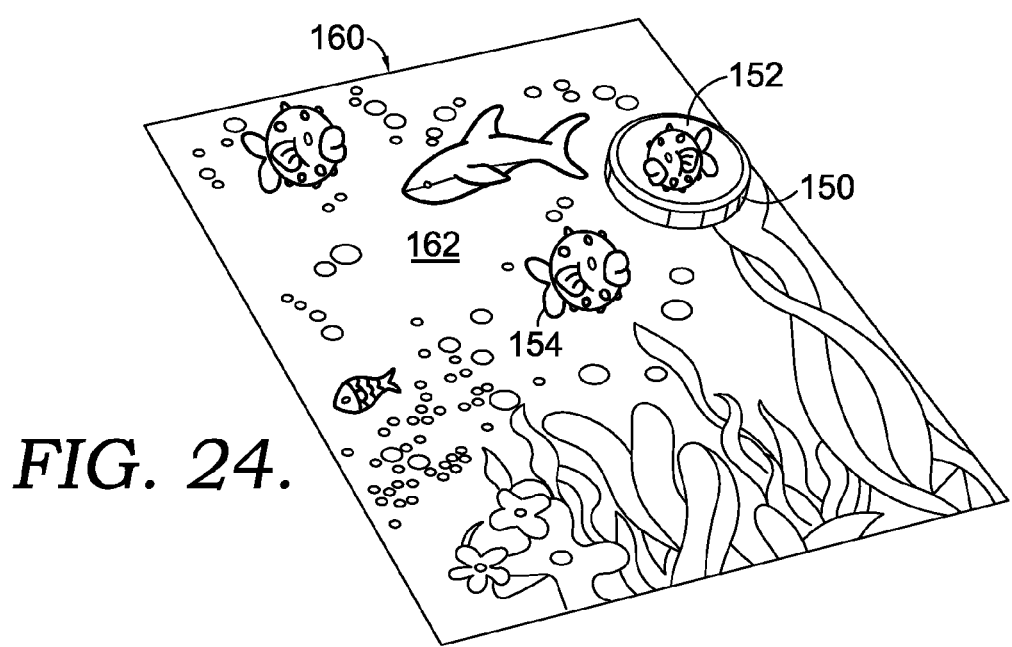
FIG. 24 is a perspective view of the traditional self-inking stamp features of the digital stamping device of FIG. 22B interacting with a writing surface, in accordance with an embodiment of the invention.

Referring next to FIG. 22A, a digital stamping device 142 is provided for use with a touch-screen device. The digital stamping device 142 includes a top surface 144 having a digital stamping image 146. Digital stamping image 146 is recognizable by an application running on a touch-screen device. The digital stamping device 142 includes a cap 148 and a base 150 that couple together to provide a single unit. As shown in FIG. 22B, the base 150 includes a self-inking stamp surface 152 with a self-inking stamp image 154 for stamping on a non-digital surface, such as a piece of paper. In embodiments, digital stamping device 142 may be used to stamp a digital stamping image 146 on a touch-screen device 156, as shown in FIG. 23. Accordingly, having contacted the top surface 144 of the digital stamping device 142 with the surface 158 of touch-screen device 156, the digital stamping image 146 is captured on screen 158 in the location where it was stamped. In the example of FIG. 24, having contacted the self-inking stamp surface 152 with a non-digital writing surface 162 (such as a paper coloring book), the self-inking stamp image 154 is captured on the writing surface 162 as stamped.

In embodiments, each time a digital stamping device 142 contacts a surface 158 of a touch-screen device 156, another digital stamping image 146 is captured on the screen 158. In further embodiments a digitally stamped image on a screen 158 may be animated and/or activated by a user and/or by the application running on the touch-screen device 156. For example, the digital stamping image 146 may be stamped onto screen 158 and subsequently animated to "swim" around on the digital coloring page displayed on screen 158. In embodiments, additional enhancements such as sound, light, and/or color enhancements are associated with a stamped image such as digital stamping image 146 on the screen 158. In further embodiments, the stamped images may be interacted with by a user manipulating various features on the touch-screen device 156.

As shown in FIG. 23, in some embodiments, both a digital crayon 128 and a digital stamping device 142 may be used to color a digital coloring page displayed on touch-screen device 156. In embodiments, a user may stamp a digital stamping image 146 on the screen 158, and color the same image in using the digital crayon 128. In further embodiments, the digital crayon 128 may be used to indicate enhancements to the stamped image, such as animation, sound, and/or color enhancements to the image displayed on the screen 158. Accordingly, an application running on touch-screen device 156 may be configured to display digital coloring pages for coloring with digital crayons 128, stamping with digital stamping devices 142, and animation/enhancement of the elements on the digital coloring pages (such as the images colored by a user that were already part of the coloring page—i.e., not stamped by a digital stamping device 142) and/or animation/enhancement of digital stamping images 146.

Ultimate Art Case Digital Tools

Figure 25:
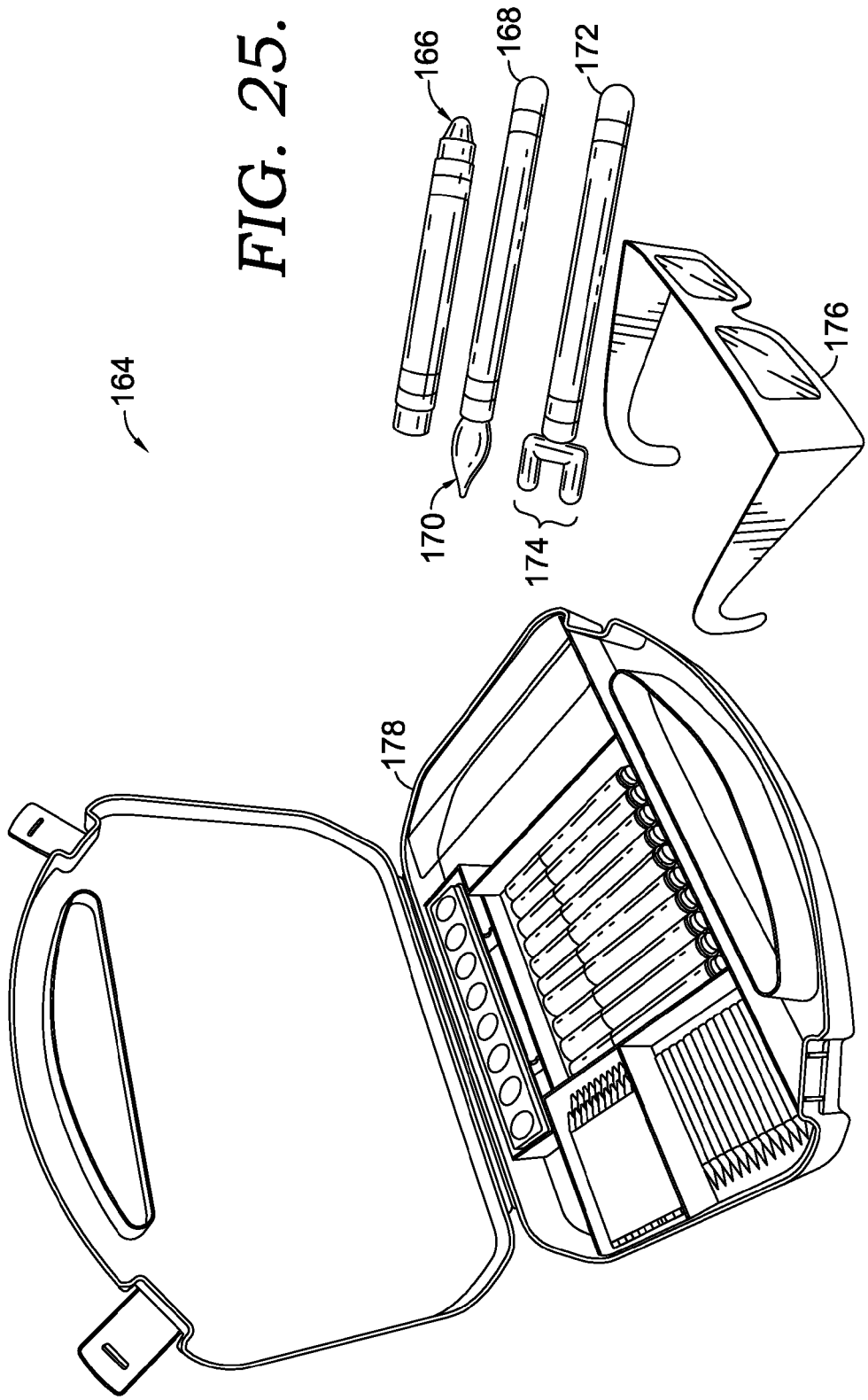
FIG. 25 is a perspective view of digital tools for interacting with a touch-screen device, including a digital crayon, a digital paintbrush, a dual-tip digital stylus for creating 3-dimensional (3-D) images, and a pair of 3-D glasses for use with the dual-tip stylus, in accordance with an embodiment of the invention.

Referring to FIG. 25, an exemplary plurality of digital tools 164 is provided. Digital tools 164 include a digital crayon 166, a digital paintbrush 168 having a paintbrush tip 170, a 3-D digital stylus 172 having dual tips 174, a pair of 3-D glasses 176, and an art case 178. Embodiments of the digital crayon 166 are similar to those discussed with respect to the digital crayon 128 of FIGS. 19-21. Accordingly, a conductive element may be coupled to the digital crayon 166 to facilitate interaction of the tip of the digital crayon 166 with a touch-screen device. In embodiments, the paintbrush tip 170 of digital paintbrush 168 includes a plurality of conductive bristles that are recognizable by a touch-screen device. Further, the 3-D digital stylus 172 has dual tips 174, and a conductive element coupled to the digital stylus 172, to facilitate interaction of the tips 174 of the digital stylus 172 with a touch-screen device. Accordingly, the dual tips 174 may be individually identifiable by a touch-screen device. For example, in one embodiment, one of the dual tips 174 is red, while the other dual dip 174 is blue. A pair of 3-D glasses 176 may then be used to detect a marking from the red and blue tips 174 of the 3D digital stylus 172 on a touch-screen device.

As similarly discussed with respect to the digital crayon 128 of FIGS. 19-21, one or more of the digital tools 164 may be detected by a camera on a touch-screen device, prior to contact with the surface of the touch-screen device. For example, the digital paintbrush 168 may be detected by the camera on a touch-screen device, such that subsequent contact by the conductive tip 170 with the screen results in the generation of corresponding brushstroke images on the screen. Similarly, a 3-D digital stylus 172 may be detected by the camera on a touch-screen device, such that subsequent contact by the dual tips 174 with the screen results in generation of a corresponding 3-D drawing image. As will be understood, any method of recognition may be used by the touch-screen device, such as capturing an image of an identifying marking on the body and/or housing of the digital crayon 166, the digital paintbrush 168, and/or 3-D digital stylus 172.

Many different arrangements of the various components depicted, as well as components not shown, are possible without departing from the scope of the claims below. Embodiments of the technology have been described with the intent to be illustrative rather than restrictive. Alternative embodiments will become apparent to readers of this disclosure after and because of reading it. Alternative means of implementing the aforementioned can be completed without departing from the scope of the claims below. Certain features and subcombinations are of utility and may be employed without reference to other features and subcombinations and are contemplated within the scope of the claims.

The invention claimed is:

1. A digital pattern-making device comprising:
   a base unit that houses a touch-screen device;
   a plurality of attachment points coupled to a surface of the base unit;
   at least one template frame removably coupled to one or more of the plurality of attachment points, the at least one template frame comprising a plurality of gear teeth disposed along an interior edge of the at least one template frame; and
   at least one pattern disc having a plurality of gear teeth disposed along a perimeter of the disc, wherein rotational movement of the at least one pattern disc in the same plane as the at least one template frame engages at least one of the plurality of gear teeth disposed along the perimeter of the at least one pattern disc with at least one of the plurality of gear teeth disposed along the interior edge of the at least one template frame.

2. The digital pattern-making device of claim 1, wherein the plurality of attachment points comprises a plurality of attachment pegs extending from a top surface of the base unit.

3. The digital pattern-making device of claim 1, wherein the at least one pattern disc comprises at least one opening.

4. The digital pattern-making device of claim 3, wherein the at least one opening is adapted to receive a tip of at least one marking device.

5. The digital pattern-making device of claim 4, wherein the at least one marking device comprises one or more of a digital crayon, a digital stylus, an I-marker, a marker, a pencil, and a crayon.

6. The digital pattern-making device of claim 4, wherein the touch-screen device is configured to display one or more markings upon contact of a screen surface of the touch-screen device with the tip of the at least one marking device.

7. The digital pattern-making device of claim 6, wherein the tip of the at least one marking device is used to rotationally move the at least one pattern disc around the interior edge of the at least one template frame, forming a pattern of the one or more markings.

8. The digital pattern-making device of claim 7, wherein the pattern is changed by at least one of the following:
   (1) one or more of a curvature and a shape of the interior edge of the at least one template frame,
   (2) one or more of a spacing, a size, and a number of the at least one opening, and
   (3) one or more of a circumference and a shape of the at least one pattern disc.

9. The digital pattern-making device of claim 1, wherein the plurality of attachment points are removably coupled to the surface of the base unit and are movable to one or more different positions.

10. A digital pattern-making device comprising:
    a base unit configured to secure a touch-screen device having at least one screen surface;
    at least one attachment point coupled to the base unit;
    at least one template frame removably coupled to the at least one attachment point, the at least one template frame comprising a plurality of gear teeth disposed along an interior edge of the at least one template frame;
    at least one pattern disc having at least one opening and a plurality of gear teeth disposed along a perimeter of the disc, wherein the at least one pattern disc is configured to engage the at least one template frame based on one or more of the plurality of gear teeth on the at least one pattern disc adjoining one or more of the plurality of gear teeth on the at least one template frame; and
    at least one marking device configured to removably couple to at least one opening of the at least one pattern disc, wherein a tip of the at least one marking device contacts the at least one screen surface when the at least one marking device is removably coupled to the at least one opening.

11. The digital pattern-making device of claim 10, wherein contact between the tip of the at least one marking device and the at least one screen surface corresponds to a least one marked pattern displayed by the touch-screen device.

12. The digital pattern-making device of claim 11, wherein the at least one pattern disc comprises a first pattern disc having a first shape, and a second pattern disc having a second shape different than the first pattern disc.

13. The digital pattern-making device of claim 12, wherein the first pattern disc corresponds to a first marked pattern displayed on the screen surface, and the second pattern disc corresponds to a second marked pattern displayed on the screen surface.

14. The digital pattern-making device of claim 11, wherein the at least one template frame comprises a first template frame having a first interior edge shape and a second template frame having a second interior edge shape different than the first template frame.

15. The digital pattern-making device of claim 14, wherein the first template frame corresponds to a first marked pattern displayed on the screen surface, and the second template frame corresponds to a second marked pattern displayed on the screen surface.

16. The digital pattern-making device of claim 11, wherein the at least one pattern disc comprises a first pattern disc having a first opening configuration, the first opening configuration comprising one or more of a first opening shape and a first opening size, and a second pattern disc having a second opening configuration, the second opening configuration comprising one or more of a second opening shape and a second opening size.

17. The digital pattern-making device of claim 16, wherein the first opening configuration corresponds to a first marked pattern displayed on the screen surface, and the second opening configuration corresponds to a second marked pattern displayed on the screen surface.

* * * * *